United States Patent [19]
Harroun

[11] Patent Number: 5,342,155
[45] Date of Patent: Aug. 30, 1994

[54] SPINDLE EXTENSION WITH SELF-CONTAINED PULL-STUD DRAW BAR ASSEMBLY

[75] Inventor: Hugh Harroun, Holly, Mich.

[73] Assignee: Harroun Enterprises, Fenton, Mich.

[21] Appl. No.: 67,641

[22] Filed: May 26, 1993

[51] Int. Cl.⁵ .............................................. B23C 5/26
[52] U.S. Cl. ..................................... 409/131; 408/240; 409/233
[58] Field of Search ............... 409/144, 230, 233, 234, 409/232, 131, 132; 408/239 R, 239 A, 240

[56] References Cited

U.S. PATENT DOCUMENTS

| | | | |
|---|---|---|---|
| 3,269,271 | 8/1966 | Bruckner | 409/233 |
| 4,334,811 | 6/1982 | Trumpf et al. | 409/233 |
| 4,548,532 | 10/1985 | Watanabe et al. | 409/233 |
| 4,589,808 | 5/1986 | O'Connor | 409/233 |
| 4,822,220 | 4/1989 | Danielsson et al. | 409/233 |

FOREIGN PATENT DOCUMENTS

| | | | |
|---|---|---|---|
| 0024944 | 2/1984 | Japan | 409/233 |
| 513793 | 6/1976 | U.S.S.R. | |
| 65675 | 4/1979 | U.S.S.R. | |

Primary Examiner—Z. R. Bilinsky
Attorney, Agent, or Firm—Dykema Gossett

[57] ABSTRACT

A spindle extension, especially for drilling and milling operations is desirable to complete many modern die molds or to protect the host machine spindle from undesirable wear. The inventive spindle extension contains its own pull stud draw bar assembly that works in tandem with the host machine power draw bar that is easily activated to provide quick and secure tool changes. Surrogate and long-reach embodiments are disclosed.

23 Claims, 3 Drawing Sheets

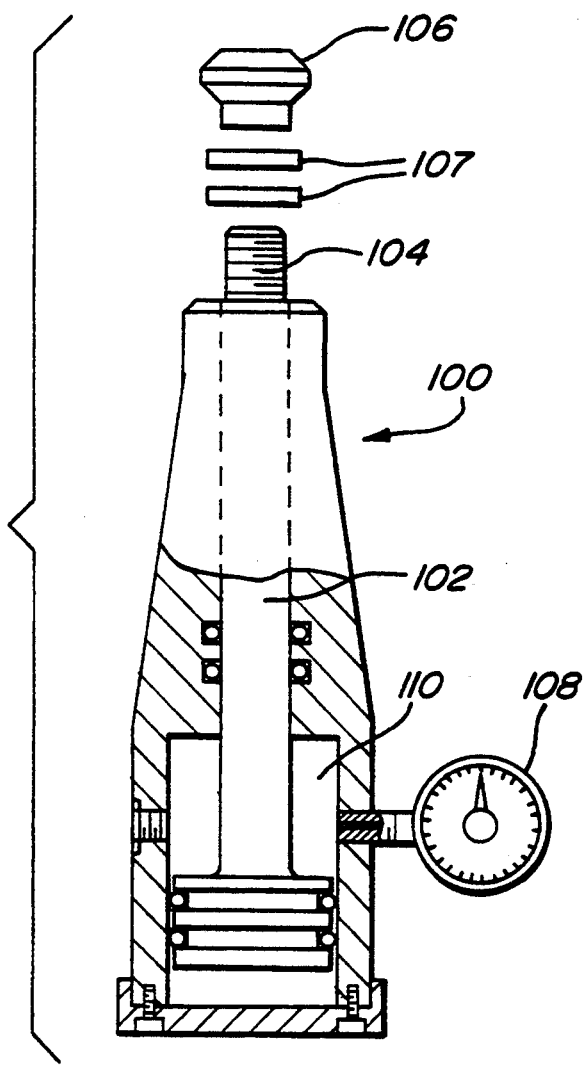
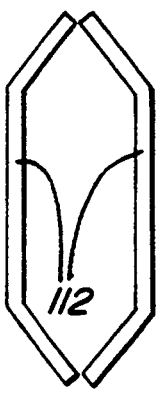
*Fig-4A*
PRIOR ART
*Fig-4B*
PRIOR ART
*Fig-3*
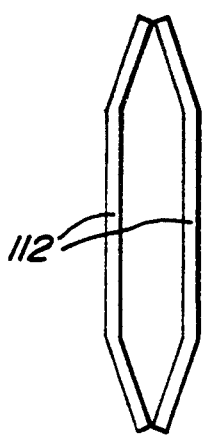
*Fig-4C*
PRIOR ART

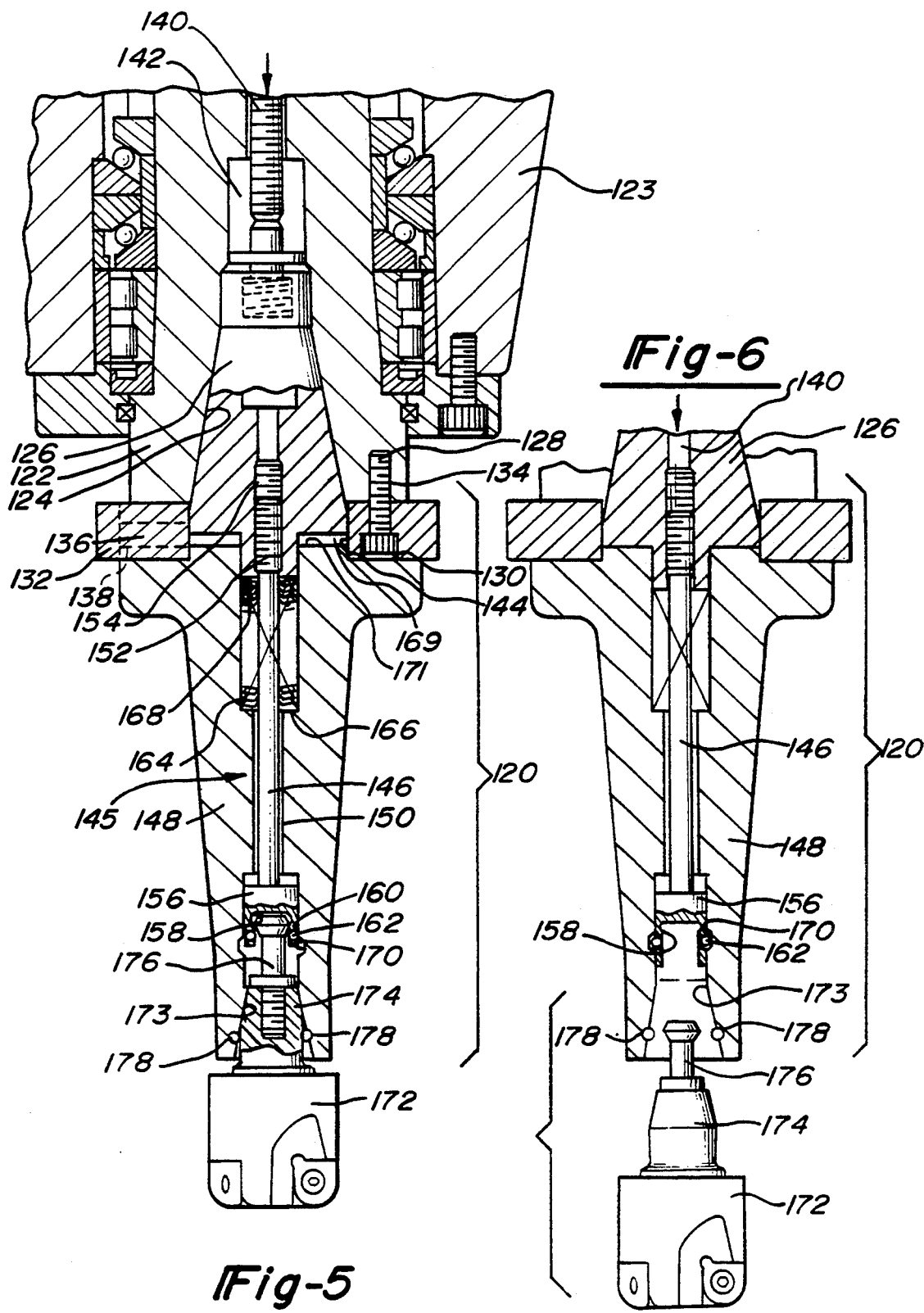

SPINDLE EXTENSION WITH SELF-CONTAINED PULL-STUD DRAW BAR ASSEMBLY

BACKGROUND OF THE INVENTION

The present invention relates to a milling machine spindle extension having a self-contained pull-stud draw bar assembly.

There are two widely recognized problems within the profile milling industry. First, modern molds and dies currently include deeper cavities than were previously used. Standard milling tools are typically too short to construct such deep cavities. Second, direct coupling of a milling tool to a host machine spindle may result in undesirable wear and abuse to that spindle during heavy milling operations.

Commonly attempted solutions to the two noted problems include spindle extensions. Two different types of spindle extensions are employed to alleviate the two problems. A long-reach spindle extension can help achieve deeper mold cavities. Surrogate spindle extensions help to minimize the wear and abuse to a host machine spindle bore during heavy milling. The surrogate extensions are typically much shorter and more durable than the long-reach extensions. Previously, both types of extension include the undesirable feature that, once attached to the machine spindle, the machine power draw bar tool-connecting apparatus is unusable. The latter feature renders spindle extensions cost inefficient relative to conventional milling directly from the host machine spindle.

A commonly used spindle extension, for both types of applications described above, is called a weldon shank spindle extension. There are several problems with weldon shank configurations stemming from the necessary use of set screws that maintain the tool in a secured position within the spindle extension. The set screws cause tool holder elongation that increases tool vibration and tends to hasten tool runout. Further, set screws tend to vibrate loose during heavy milling operations. Other problems with weldon shank configurations include the low percentage of surface contact between the tool shank and the spindle extension tool receiving bore, again causing excess vibration.

Other spindle extensions include collet systems in which a tool holder is secured by a draw bolt contained within the spindle extension. Draw bolt collet systems are inefficient because the entire extension must be removed from the host machine to access the draw bolt for tool changes. Other collet systems use exterior nuts to secure a tool in place but these have several disadvantages. A main disadvantage is that an exterior nut increases the diameter of the extension which results in a lower clearance profile, and possible inaccurate die making. A high clearance profile is essential when utilizing a long-reach spindle extension. A second disadvantage to the collect systems is that a relatively large amount of extra time and tools are needed for a machine operator to complete a tool change and resume a milling operation.

One other type of extension utilizes threaded tool connections. Threaded tool connections are solid, however, they also have disadvantages. The biggest difficulty involved with threaded tool connections is that the tool may seize within the extension due to the high torques associated with normal milling operation. Thus, threaded tool connections are not a viable alternative for the current milling industry.

SUMMARY OF THE INVENTION

The present invention provides a spindle extension that firmly holds tools, allows quick, easy tool changes and promotes accurate milling. Thus, the spindle extension of the present invention provides a strong, accurate and efficient method of extending the length of a milling tool to achieve deeper mold cavities and to preserve the integrity of the host machine spindle bore. Moreover, the present invention allows a machine operator to use tapered shank tools in a wider variety of milling operations thereby ensuring optimum tool performance and economies.

A spindle extension according to the present invention includes a generally cylindrical extension sleeve that connects to a standard milling machine spindle. The end of the cylindrical extension opposite the machine holds a milling tool firmly in place in a manner that allows easy tool changes. The tool is held in place through the use of a pull stud draw bar assembly that is contained within the spindle extension. The inventive configuration achieves the goals of promoting accurate, deeper mold cavities and/or protecting the host machine spindle bore from undesirable wear, while allowing a milling machine operator to quickly and effectively change tools.

The extension pull stud draw bar assembly is partially contained within a hollow cylindrical portion in the spindle extension. The pull stud draw bar assembly has a pull sleeve at one end, that is essentially a cylindrical sheath adapted to grasp the chuck on the end of a standard tool holder. The pull sleeve preferably includes several ball bearings set within radially bored holes within the sleeve. The ball bearings preferably partially protrude into the interior of a bore in the pull sleeve, preventing a properly positioned tool chuck from moving outwardly away from the spindle extension. The extension pull stud draw bar assembly may be positioned to allow the ball bearings to move radially outwardly into a widened hollow portion within the cylindrical extension. In the latter position, a tool can be inserted into or removed from the spindle extension.

The extension pull stud draw bar assembly is preferably activated by a hydraulic power draw bar on a host machine. The extension pull stud draw bar assembly is spring biased towards the machine such that the host machine power draw bar can grasp the pull stud at one end of the extension pull stud draw bar assembly. In this position, the extension pull stud draw bar assembly is set to grasp or release a tool, depending on the current operation. Upon activating the host machine power draw bar, the extension pull stud draw bar assembly is pulled into the spindle extension, firmly grasping and pulling a tool into place.

The extension pull stud draw bar assembly is preferably adjustable in length. A single length extension bar assembly that acts in unison with the host machine power draw bar may not be feasible in many applications. A long-reach spindle extension, as discussed above, requires a small diameter to accommodate high profile milling operations. This size limitation dictates that any pull stud draw bar assembly within the spindle extension be of small diameter. A small diameter bar assembly may not easily adapt to the forces applied by a standard milling machine hydraulic power draw bar apparatus. By providing an adjustable length pull stud draw bar assembly within the inventive spindle extension, the problem of adaptability is eliminated.

In another embodiment, the adjustable length draw bar assembly within the invention is preferably not an extension of the host machine's power draw bar. The extension draw bar assembly is spring biased towards the machine, and inwardly into the spindle extension in a retracted position before activation. The extension preferably utilizes a tapered shank that fits snugly into the host machine's spindle. This shank is connected to the extension power draw bar. The host machine power draw bar presses against the shank upon activation. The shank is then moved in an outward direction relative to the spindle. Such outward motion moves the extension draw bar assembly against the bias and in an outward direction relative to the spindle extension. In this position, the extension draw bar assembly is set to grasp or release a tool, depending on the current operation. Upon deactivating the host machine power draw bar, the extension draw bar assembly is biased back into the spindle extension firmly grasping a tool and pulling it into place. The bias force is preferably provided by an internal spring strong enough to retain a tool snugly within the spindle extension. In this manner the extension draw bar assembly holds a tool firmly in place acting independently of the host machine power draw bar. The host machine power draw bar serves to activate the extension draw bar assembly, yet the two do not pull at the same time. In fact, the host machine's apparatus does not pull anything, it simply provides a compressive force to activate the spindle extension draw bar assembly.

The tool receiving end of the spindle extension is configured to avoid rotation of the tool relative to the spindle extension. To maintain a small spindle extension diameter, drive dogs are preferably disposed within the spindle extension. In one embodiment, the present invention preferably uses a pin drive system within the tool receiving end of the long reach extension. The pins are set such that a tool held in the spindle extension butts up against the pins and does not rotate relative to the spindle extension. The pins preferably are set radially opposite and parallel to each other. The pin drive system utilized in the present invention is somewhat different than those used in the past. Past pin drive systems typically served the functions of holding a tool in place rotationally and inward into a spindle. The present pin drive system simply serves as driving dogs contained within the spindle extension. Therefore, the invention requires no set screws nor does it require any collets or external drive dogs to hold the tool firmly in place.

These and other features and objects of the present invention can best be understood from the following specification and drawings, of which the following is a brief description.

BRIEF DESCRIPTION OF THE DRAWINGS

FIG. 3 is a longitudinal partial cross-sectional view of a gauging device that can be used in connection with the inventive long-reach spindle extension.

FIGS. 4(a) through 4(c) are planar view diagrams of compression springs typically employed in a host machine power draw bar apparatus.

FIG. 5 is a longitudinal cross-sectional view of another embodiment of the inventive spindle extension holding a tool firmly in place.

FIG. 6 is a longitudinal cross-sectional view of one embodiment of the inventive spindle extension positioned to release or receive a tool.

DETAILED DESCRIPTION OF THE PREFERRED EMBODIMENTS

Figures 1, 2:
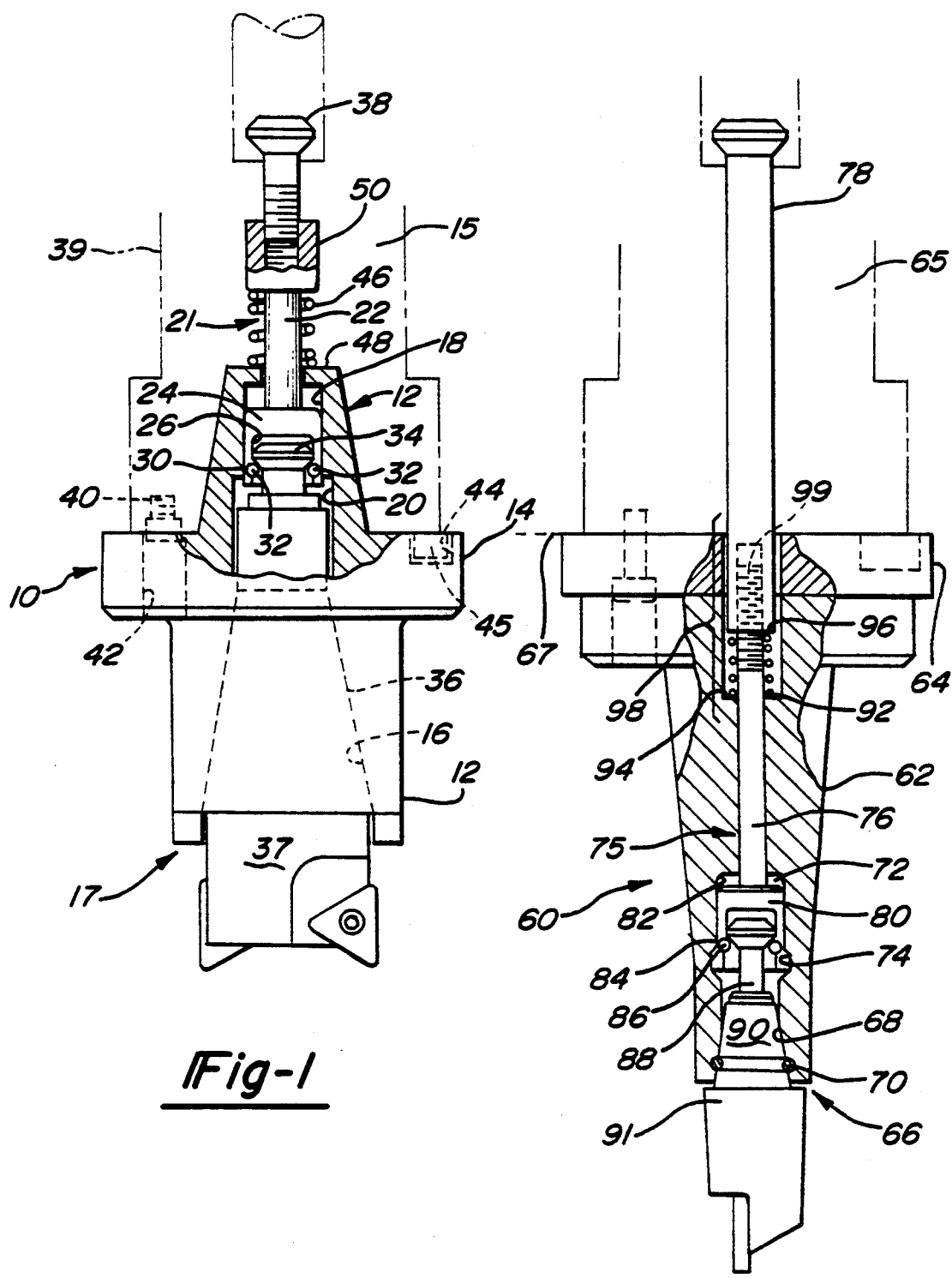
FIG. 1 is a longitudinal partial cross-sectional view of one embodiment of the inventive surrogate spindle extension holding a tool firmly in place.
FIG. 2 is a longitudinal partial cross-sectional view of one embodiment the inventive long-reach spindle extension positioned to release or receive a tool.

FIG. 1 shows one embodiment of the inventive surrogate extension 10. Surrogate extension 10 has a generally cylindrical sleeve 12. In the illustrated embodiment, sleeve 12 has non-constant outer diameters. A larger outer diameter is shown in the lower portion of the sleeve 12 beneath the flange 14. The portion of the sleeve 12 shown above the flange 14 is of a smaller outer diameter and has a slightly tapered shape. This upper portion of the sleeve 12 is to be received into the host machine spindle 15 (schematically shown in phantom). The lower portion of sleeve 12 contains a generally conical bore 16 at a tool receiving end 17. The upper portion of the sleeve 12 contains a bore 18 having a nominal radius and a bore 20 of a slightly larger radius adjacent bore 18. An extension pull stud draw bar assembly 21 includes draw bar 22 which is slidably received within bore 18. At one end of extension pull stud draw bar assembly 21 is a pull sleeve 24. Pull sleeve 24 has an axial bore 26 and a plurality of radial bores 30 each receiving a ball 32. In one embodiment there are preferably 5 radial bores 30. Balls 32 rest within each radial bore 30 such that each ball 32 can move radially, partially protruding into axial bore 26 while being restricted from moving axially relative to pull sleeve 24.

Extension pull stud draw bar assembly 21 is shown in a retracted position such that pull sleeve 24, in conjunction with balls 32, is grasping and holding a tool pull stud 34 firmly in place. Tool pull stud 34 is connected to tool holder 36 in a conventional manner and tool holder 36 is connected to a tool 37 also in a conventional manner.

At the end of extension pull stud draw bar assembly 21 opposite from pull sleeve 24 is a pull stud 38 adjustably connected to extension draw bar 22 such that the overall length of pull stud draw bar assembly 21 is adjustable. Pull stud 38 is grasped by the host machine power draw bar apparatus (not shown) such that extension draw bar 22 is pulled in a retracted position (upward according to the drawing).

In one embodiment, the inventive surrogate extension is preferably designed to receive a cutting tool including a national machine tool 50 taper. A national machine tool 50 taper tool connection provides a much stronger connection over 2 inch diameter weldon shank connections. The 50 taper tool connection has the advantage of reducing cutting tool runout and improving dimensional control of the workpiece. The 50 taper tool connection within the inventive spindle extension provides a longer useful life compared to the weldon shank spindle extensions. The inventive spindle extension, therefore, provides for greater surface contact between the tool holder and the extension, therefore, yielding a stronger and more efficient tool connection. Moreover, the inventive surrogate extension allows an operator to use standard heavy milling tools and the host machine power draw bar apparatus while protecting the host machine spindle from undesirable wear. Therefore, the inventive surrogate extension enhances efficiency during a standard heavy milling operation.

The inventive surrogate extension works generally as follows. Surrogate extension 10 is connected to the spindle of the host machine 39 (shown schematically in phantom) in a conventional manner including bolts 40 which are inserted through counter bore 42 on flange 14. The spindle extension 10 is prevented from rotating relative to the host machine spindle by driving dogs 45 on the host machine 39 which fit into slots 44 on flange 14. Preferably, a plurality of bolts and driving dogs are employed, however, FIG. 1 only illustrates one of each. When surrogate extension 10 is connected to the host machine spindle the upper portion of sleeve 12 is received within the bore on the host machine spindle that normally receives a milling tool. Surrogate extension 10 may be centered on spindle 15 in a conventional manner; for example by a locator ring.

Spring 46 biases extension pull stud draw bar assembly 21 upward into the host machine spindle 15. Spring 46 bears against reaction surface 48 defined on the sleeve 12 and reaction surface 50 defined on the extension pull stud draw bar assembly 21. Spring 46 preferably maintains pull stud 38 in a position where it may be grasped by the host machine power draw bar apparatus. Spring 46 provides the additional advantage of allowing some axial movement by extension pull stud draw bar assembly 21 when the host machine power draw bar apparatus contacts pull stud 38. In this manner, the host machine is protected from potential damage. In some applications it may be feasible to eliminate spring 46.

Tool holder 36 is preferably tapered and placed within the generally conical bore 16 in the tool receiving end 17 of surrogate extension 10. A machine operator can activate the host machine power draw bar apparatus, typically by pressing an actuating button. The host machine power draw bar corresponding moves into a position to grasp pull stud 38. The host machine power draw bar then grasps pull stud 38 in a conventional manner as it retracts into the host machine, thereby, drawing extension pull stud draw bar assembly 21 inward toward the host machine 39 (upward according to the drawing). This action causes balls 32 (which were previously resting within bore 20) to protrude radially inward into pull sleeve bore 26 as the balls 32 bear against bore 18. Pull sleeve 24 thus, firmly grasps pull stud 34. During this movement, pull stud 34 and, consequently, tapered shank tool holder 36 are drawn inward into the spindle extension 10 and the tool 37 is held firmly in place. Tool holder 36 preferably is shaped such that the tool cannot rotate relative to the spindle extension 10.

FIG. 2 shows one embodiment of the inventive long-reach spindle extension 60. Long-reach extension 60 has a generally cylindrical sleeve 62 connected to flange 64. In the illustrated embodiment, flange 64 is disposed at one end of sleeve 62. Long-reach extension 60 is connected to the host machine spindle 65 in a conventional manner; similar to that described with reference to FIG. 1. The spindle extension 60 is prevented from rotating relative to the machine spindle by driving dogs 43 that fit into slots 44 on flange 64. Accordingly, tool receiving end 66 on sleeve 62 points in a direction away from the host machine spindle 65 when extension 60 is appropriately connected to a host machine 67.

Tool receiving end 66 contains a generally conical bore 68 that contains, driving pins 70. Driving pins 70 are maintained within the tool receiving end 66 of long-reach extension 60 such that a minimum outer diameter of sleeve 62 can be maintained. A smaller outer diameter is advantageous for long-reach spindle extensions because the smaller diameter provides a higher clearance profile for deep bore milling operations. A higher clearance profile corresponds to tighter tolerances in the workpiece. Maintaining driving pins 70 within the spindle extension 60 prevents a tapered shank milling tool from rotating relative to the spindle extension 60 while maintaining the smallest possible outer diameter. Driving pins 70 within tool receiving end 66, therefore, eliminate the need for any set screws or external collet nuts and allow for more accurate milling while increasing operation efficiency.

Sleeve 62 contains a bore 72 of a nominal radius and an adjacent bore 74 with a radius slightly larger than the nominal radius of bore 72. Extension pull stud draw bar assembly 75 includes draw bar 76 which is slidably received within bore 72 such that one end of extension pull stud draw bar assembly 75 is disposed within sleeve 62 while an axially opposite end is disposed within the host machine spindle. Pull stud 78, connected to draw bar 76, is grasped and axially displaced by the host machine power draw bar apparatus when desired. Axially opposite pull stud 78 on bar assembly 75 is a pull sleeve 80 that contains an axial bore 82. Pull sleeve 80 also contains a plurality of radial bores 84 that receive balls 86. The pull sleeve in FIG. 2 is similar to that described with reference to FIG. 1 except that in a long-reach spindle extension the pull sleeve necessarily must be of a smaller cross-sectional dimension. Pull sleeve 80 works according to the description of pull sleeve 24 with reference to FIG. 1 in order to grasp pull stud 88 connected in a conventional manner to tapered shank tool holder 90 to thereby maintain tool 91 in proper position relative to spindle extension 60.

Spring 92 bears at one end against reaction surface 94 defined on the sleeve 62 and at the other end against reaction surface 96 defined on extension draw bar 76. Spring 92 serves the same function for the long-reach spindle extension 60 that spring 46 served relative to the surrogate extension 10 described above.

The overall operation of the long-reach spindle extension parallels that described above with reference to the surrogate extension 10 and FIG. 1. However, there is one important difference between a long-reach spindle extension and a surrogate extension. A long-reach extension, as described above, must have a minimum outer diameter to maintain a high clearance profile. Accordingly, extension pull stud draw bar assembly 75 must have a minimum diameter.

In one embodiment, draw bar 76 fits within bore 72 which has a 1.625 inch diameter. Tool holder 90 has a 20 degree included angle and pull stud 88 has a 0.625 inch diameter. These dimensions are suitable for a 2 inch diameter cutting tool 91, for example. Accordingly, extension pull stud draw bar assembly 75 has a relatively small diameter.

A small diameter extension draw bar and/or tool holder may not be adaptable to the forces applied by a host machine hydraulic power draw bar apparatus. Specifically, typical machine draw bars may exert forces great enough to shear a small diameter extension draw bar or tool holder. The inventive spindle extension overcomes the problem of nonadaptability of a small diameter extension draw bar by providing pull stud draw bar assembly 75. Bar assembly 75 is adjustable in length through adjusting means 98.

Adjusting means 98 can be any means that facilitates adjusting the length of extension draw bar 76 while providing a strong axial connection between relatively adjustable portions of the extension pull stud draw bar assembly. In one embodiment, adjusting means 98 is a threaded member 99 situated such that draw bar 76 threads into a bottom end of member 99 while pull stud 78 is connected to a top end of member 99. Draw bar 76 and pull stud 78 can be threaded along member 99 to adjust the length of the bar according to the needs of the particular machine operator.

The length that extension draw bar 76 is adjusted cannot be randomly guessed without avoiding potential tool failure or damage to the host machine. The lengthening must be precisely calculated to achieve proper tool connection to the spindle extension 60 while avoiding damage to the host machine.

One method of determining the proper length adjustment of extension draw bar 76 includes the use of a gauge 100 as illustrated in FIG. 3. Gauge 100 is shaped to fit within a host machine spindle tool receiving end. Gauge 100 contains a piston 102 having a threaded end 104. A pull stud 106 and, if necessary, spacers 107, can be connected to the threaded end 104 of piston 102. Gauge 100 is inserted into the host machine spindle and the host machine power draw bar apparatus is activated. The host machine power draw bar will pull upon pull stud 106 moving piston 102 in an upward direction according to the drawing. Dial 108 registers the amount of pressure built up within chamber 110. Chamber 110 can contain, for example, air or oil. In this manner, the pressure exerted by the host machine power draw bar apparatus can be gauged.

Assume for example, that a machine operator realizes that he needs to use a long-reach spindle extension having a milling tool connected to it by approximately 2,000 lbs. of pressure. The machine operator can connect pull stud 106 to the threaded end 104 of piston 102 and insert gauge 100 into the host machine spindle. Activating the host machine power draw bar apparatus provides a reading on dial 108 of how much pressure is exerted by the host machine power draw bar apparatus. The machine operator can then deactivate the host machine draw bar apparatus and remove gauge 100 from the spindle. The operator can then insert spacers 107 between pull stud 106 and gauge housing 109 and repeat the gauging operation just described. Assume further, that the machine operator inserted a ⅜ inch spacer between the pull stud 106 and gauge housing 109 and that the dial now reads 2,000 lbs. when the host machine power draw bar apparatus is fully activated. Now, the machine operator realizes that he must adjust extension draw bar 76 by lengthening it ⅜ of an inch to achieve the desired pull pressure of 2,000 lbs using that particular host machine.

Such gauging is possible given the nature of a typical host machine power draw bar apparatus. Referring now to FIGS. 4(a) through 4(c), compression springs 112 typically employed in connection with a host machine power draw bar apparatus in a conventional manner are shown in various configurations. FIG. 4(a) shows a pair of compression springs in a relaxed position. Such a relaxed position corresponds to a deactivated host machine power draw bar. In such a position, the springs exert no pulling power. FIG. 4(b) shows a pair of compression springs fully compressed. A fully compressed position corresponds to 100% pulling power as the springs 112 strive to expand to a relaxed position. The springs are fully compressed when the host machine draw bar moves outward relative to the host machine spindle to its maximum longitudinal displacement. This displacement is commonly referred to as host machine power draw bar travel. Typically, a standard milling tool pull stud is grasped by the host machine draw bar as described above when compression springs 112 are in a position as illustrated in FIG. 4(b). Allowing compression springs 112 to relax to a position somewhere between the position illustrated in FIG. 4(a) and the position illustrated in FIG. 4(b) provides a varied amount of pulling power from the host machine power draw bar apparatus. For example, FIG. 4(c) shows a pair of compression springs 112 in a 50% relaxed position. Assuming, for example, that the host machine draw bar apparatus typically exerts forces on the order of 10,000 lbs. in a fully compressed position as illustrated in FIG. 4(b), FIG. 4(c) may correspond to a pull force of approximately 5,000 lbs. By using the gauge 100, as described in connection with FIG. 3, a machine operator can determine what axial distance compression springs 112 must effectively relax to achieve the desired pulling pressure for the particular milling operation. In this manner, the extension pull stud draw bar assembly 75 on the inventive long-reach spindle extension 60 can be adjusted accurately to provide safe, quick and secure tool connections by utilizing the host machine draw bar apparatus in tandem with the extension pull stud draw bar assembly 75. Therefore, it becomes possible to efficiently utilize tapered shank tool connections in milling operations where a spindle extension is desirable or necessary.

Referring now to FIG. 5, an alternative embodiment of the inventive spindle extension 120 is connected to a spindle 122 of a standard milling machine 123. Spindle 122 contains a conical bore 124 which is adapted to receive a tapered shank 126 from spindle extension 120.

Spindle extension 120 is fastened to spindle 122 using threaded bolts 128 which pass through a bore 130 of the flange 132 and thread into threaded bores 134 in spindle 122. In this manner, the spindle extension is held firmly against spindle 122. Spindle extension 120 is prevented from rotating with respect to spindle 122 by driving dogs 136 which fit into circumferentially-spaced slots 138 contained on the flange 132. One preferred embodiment contains 4 threaded bolts 128 and corresponding bores 134 and two driving dogs 136 with corresponding slots 138. The cross-section of the figure extends through one of each type member.

The shank 126 is situated within the conical bore 124 such that the power draw bar 140 of the host machine, which has an end pull sleeve 142, contacts an inner end of shank 126. When pull sleeve 142 applies a compressive force onto shank 126, the shank will move in an outward direction relative to the spindle, further into a central bored recess 144 within flange 132. The outward motion of the tapered shank causes power draw bar assembly 145 to move axially in relation to a cylindrical extension sleeve 148 of the spindle extension 120. Power draw bar assembly 145 includes shank 126 and a draw bar 146. Power draw bar 146 is slidably carried within an internal cylindrical bore 150 of the cylindrical sleeve 148. The motion of tapered shank 126 causes the power draw bar assembly 145 to move outward relative to the cylindrical sleeve 148. A threaded end 152 of power draw bar 146 is preferably inserted into a threaded bore 154 of the tapered shank 126 such that the two move integrally. The threaded connection provides the advantage of allowing the overall length of power draw bar assembly 145 to be adjusted. This advantage will be further described below. A pull sleeve 156 is disposed at the opposite end of the power draw bar assembly 145 and has a cylindrically bored center 158, radially bored holes 160 and ball bearings 162.

Power draw bar assembly 145 is biased inwardly by disc springs 164. The disc springs 164 are set between a reaction surface 166 defined within the cylinder 150 and a reaction surface 168 defined upon the bar 146. The disc springs 164 bias power draw bar assembly 145 into the cylindrical sleeve 148 towards a retracted position. When power draw bar assembly 145 is maintained in this retracted position, a gap 169 exists between the tapered shank 126 and an outermost end 171 of the central bored recess 144 of the flange 132. In the same position, ball bearings 162 are maintained just above a notch 170 defined within the cylindrical bore 150. In this position the inner surface of cylindrical bore 150 forces ball bearings 162 radially inwardly, and further into cylindrically bored center 158 of pull sleeve 156 to hold a tool in place as described further below.

Upon activation of the host machine power draw bar 140, pull sleeve 142 moves outwardly relative to the spindle and contacts and presses upon tapered shank 126. Power draw bar assembly 145 is then forced to move outward relative to cylindrical sleeve 148. As shown in FIG. 6, as power draw bar assembly 145 moves outwardly, ball bearings 162 become aligned with, and may move radially outward into notch 170. A machine operator may properly align and then insert tool 172 into a conically bored portion 173 of the cylindrical sleeve 148. The portion of the tool 172 that fits into the conically bored portion 173 includes the tapered tool holder 174 which has a tool chuck 176 connected to it in a conventional manner. Tool chuck 176 is preferably shaped so that it bears against ball bearings 162 moving them radially outward into notch 170 when the tool 172 is inserted into cylindrical extension 148. The tool can be removed in the reverse manner. Once the tool has been inserted so tool chuck 176 is within the cylindrically bored center 158 of pull sleeve 156, the inventive power draw bar apparatus can hold the tool in the spindle extension, as it retracts back into the cylindrical sleeve 148 as will be explained below.

Deactivating the host machine power draw bar 140 causes pull sleeve 142 to move inwardly into host machine 123 and removes the force applied to the tapered shank 126, thereby enabling the disc springs 164 to bias power draw bar assembly 145 inward into the spindle extension 120. The ball bearings 162 are forced out of notch 170 as they bear against cylindrical bore 150. Ball bearings 162 are thereby moved radially into the cylindrically bored center 158 of the pull sleeve 156, effectively grabbing the tool chuck 176 and pulling it inward. In this manner the tool 172 is pulled tightly in the conically bored portion 173 of the cylindrical sleeve 148 as illustrated in FIG. 5.

Tapered tool holder 174 is also preferably adapted to fit against driving pins 178 contained within the conically bored portion 173 of the cylindrical extension 48. The pins are set such that a tool held in the spindle extension butts up against the pins and does not rotate relative to the spindle extension. The pins preferably are set radially opposite and parallel to each other. In this manner, the tool 172 is held rotationally still in the spindle extension 20 and ready for a standard milling operation.

Power draw bar assembly 145 is preferably adjustable in overall length. The adjustment preferably varies the size of gap 169 by means for compensating for variable host machine draw bar travel. In the illustrated embodiment, the compensating means includes the threaded connection between shank 126 and bar 146. The size of gap 169 is varied by adjusting the relative longitudinal positions of shank 126 and bar 146.

Assembly 145 should have a variable length to accommodate a variety of host machines. Milling machine power draw bar apparatus vary in several respects. One varying feature is the travel of the power draw bar within the host machine spindle. If extension 120 is employed on a machine with a travel that exceeds the size of gap 169, damage could result to the host machine or extension 120 when securing a tool as described above because shank 126 will bottom-out against flange 132.

To ensure that a minimum gap 169 exists, a machine operator should measure the travel of the particular draw bar apparatus in a conventional manner. The known travel distance can then be used to appropriately adjust the length of assembly 145 and, the size of gap 169 therefore, to avoid possible damage to the host machine or the spindle extension.

Tool connections in milling operations where a spindle extension is desirable or necessary.

It will be apparent to those skilled in the art that the foregoing disclosure is exemplary in nature rather than limiting, the invention being limited only by the appended claims.

I claim:

1. A machine for drilling and milling operations comprising:

a spindle adapted to provide rotation for a tool, said spindle having a spindle first axial end positioned within the machine, and a spindle second axial end having an internal portion adapted to receive a tool holder, said spindle second end being accessible from outside said machine;

a pulling force means within said machine;

a spindle extension removably attached to said spindle, said spindle extension having a flange nonrotatably connected to said spindle and a generally cylindrical sleeve originating near an extension first axial end and terminating at an extension second axial end, said extension second axial end being adapted to receive a tool holder and having a drive means to drive the tool holder; and a pull stud draw bar assembly, said assembly having a draw bar partially disposed and axially movable within said spindle extension, said assembly having a pull sleeve at one end of said draw bar to hold a tool, said assembly having a stud member connected to said draw at an end axially opposite from said pull sleeve and received in said internal portion of said spindle second end, said assembly having an adjustable length, said pulling force means pulling said stud member away from said extension second end.

2. A machine as recited in claim 1, wherein there are means for adjusting said adjustable length of said pull stud draw bar assembly.

3. A machine as recited in claim 1 wherein said flange is disposed at said extension first end.

4. A machine as recited in claim 1, wherein said flange is disposed at an axially intermediate point between said extension first and second ends.

5. A machine as recited in claim 1, wherein said spindle extension further comprises a cylindrically bored center within said generally cylindrical sleeve adapted to slidably receive a portion of said draw bar.

6. A machine as recited in claim 1, wherein said cylindrically bored center defines a reaction surface and contains a biasing means for biasing said pull stud draw bar assembly.

7. A machine as recited in claim 6, wherein said biasing means comprises a coil spring slidably carried upon said draw bar and having ends in contact with a first reaction surface defined on said draw bar and a second reaction surface defined on said spindle extension, said spring biasing said draw bar towards a retracted position in a direction away from said second end of said spindle extension.

8. A machine as recited in claim 1 wherein said extension second end has a generally conically bored sheath with a widest portion at said extension second end adapted to receive a tool holder.

9. A machine as recited in claim 1, wherein said drive means comprises a pair of driving pins set near a terminal point within said extension second end such that axes of said pins are generally parallel to each other.

10. A machine as recited in claim 1, wherein said draw bar has a first draw bar end connected to said stud member and a second draw bar end defining said pull sleeve, said draw bar being slidably carried within said spindle extension such that said first draw bar end is external to and extends beyond said extension first end, said second draw bar end being disposed within said spindle extension, said draw bar being axially movable within said extension.

11. A machine are recited in claim 10, wherein said pull sleeve has a cylindrically bored sheath with an interior bore adapted to retain a tool holder such that said tool holder is coupled with said spindle extension element, a plurality of holes formed in said pull sleeve each containing a ball, said holes being tapered such that each said ball with rest within the frame of said pull sleeve unable to move axially while remaining free to move radially inward enough to partially protrude into said interior bore of said pull sleeve and free to move radially outward enough to effectively exit said interior bore.

12. A machine as recited in claim 11, wherein said generally cylindrical portion has a first inner peripheral surface with a nominal radius, and further includes a second inner peripheral surface located adjacent said first inner peripheral surface and near said tool holder receiving end and extending radially outwardly beyond said nominal radius and being adapted to receive each said bell when each said ball moves in said radially outward direction.

13. A machine as recited in claim 1, wherein said generally cylindrical sleeve of said spindle extension has a length and an outer diameter, said length being substantially greater than said outer diameter.

14. A spindle extension for attachment to a spindle of a machine, comprising:
a spindle extension sleeve having a generally cylindrical portion originating at a first sleeve end and terminating at a second sleeve end axially opposite to said first sleeve end, said second sleeve end including an internal portion adapted to receive a tool holder, and having drive means to drive a tool;
a flange connected to said sleeve, said flange being adapted to be fixedly connected to a machine spindle; and
a pull stud draw bar assembly having a draw bar partially disposed and axially movable within said spindle extension sleeve, a pull sleeve being fixed to said draw bar at an end removed from a machine and adapted to grasp a tool, a stud member connected to said draw and adapted to be received in a machine spindle, and a means for adjusting a length of said pull stud draw bar assembly.

15. A spindle extension as recited in claim 14, wherein said adjusting means include at least one of said stud and said draw bar having an internally threaded bore, a threaded member being received in said bore such that said draw bar may be turned relative to said stud and said threaded member will adjust said length of said pull stud draw bar assembly.

16. A spindle extension as recited in claim 14, wherein said draw bar has a first draw bar end connected to said stud member and a second draw bar end fixed to said pull sleeve, said draw bar being slidably carried partially within said spindle extension sleeve such that said first draw bar end extends beyond said first sleeve end, said second draw bar end being disposed within said spindle extension sleeve, said pull sleeve having a cylindrically bored sheath adapted to retain a tool holder such that the tool holder is coupled with said spindle extension sleeve, and further includes a plurality of holes radially formed in said pull sleeve each contain a ball, said holes being tapered such that each said ball will rest within the frame of said pull sleeve unable to move axially while remaining free to move radially inward enough to partially protrude into the interior cylindrical bore of said pull sleeve and free to move radially outward enough to effectively exit said interior cylindrical bore.

17. A spindle extension as recited in claim 14, wherein said drive means comprises a pair of driving pins internally set near a terminal point within said second sleeve end such that axes of said pins are generally parallel to each other.

18. A spindle extension as recited in claim 14, further comprising biasing means for biasing said pull stud draw bar assembly.

19. A spindle extension as recited in claim 18, wherein said biasing means comprises a coil spring carried upon said draw bar and having ends in contact with a first reaction surface defined on said spindle extension sleeve and a second reaction surface defined on said draw bar, said spring biasing said draw bar towards a retracted position in a direction away from said second sleeve end.

20. A spindle extension as recited in claim 13, wherein said generally cylindrical portion of said spindle extension sleeve has a length and an outer diameter, said length being substantially greater than said outer diameter.

21. A spindle extension for attachment to a spindle of a machine, comprising:
a spindle extension sleeve for attachment to a spindle, said spindle extension sleeve having a first sleeve end, an axially extending generally cylindrical portion originating at said first sleeve end and terminating at a second sleeve end axially opposite to said first sleeve end, said second sleeve end having an internal conical portion adapted to receive a tool holder;

a flange connected to said extension sleeve, said flange being adapted to be non-rotatably connected to a machine spindle;

a pull stud draw bar assembly including a draw bar having a first draw bar and spaced toward a machine, a second draw bar end comprising a pull sleeve, said pull sleeve having a cylindrically bored sheath, said bar being slidably carried partially within said axially extending cylindrical portion such that said first draw bar end extends beyond said first sleeve end, said second draw bar end being situated within said spindle extension sleeve, said draw bar being axially movable within said cylindrical portion, said assembly having a stud member adapted to be received into a machine spindle, said stud member further comprising a threaded end connected to said first draw bar end such that said stud member is connected to said draw bar, the connection between said draw bar and said stud being adjustable to adjust the length of the said pull stud draw bar assembly; and a biasing means for biasing said pull stud draw bar assembly.

22. A spindle extension for attachment to a spindle of a machine having a compressive force means, comprising:

a spindle extension element for attachment to a spindle, said spindle extension element having a first end including a flange, said flange having a central cylindrical bore, said flange being adapted to be fixedly connected to a machine spindle, an axially extending generally cylindrical portion originating at said flange and terminating at a second end axially opposite to said first end, said second end comprising an internal conical portion adapted to receive a tool holder;

a bar having a first externally threaded end, a second end comprising a pull sleeve, said pull sleeve having a cylindrically bored sheath, said bar being slidably carried within said axially extending cylindrical portion such that said first end of said bar is situated near said first end of said spindle extension element and extends beyond said cylindrically bored recess of said flange, said second end of said bar being situated within said spindle extension element, said bar being axially movable within said cylindrical portion;

a biasing means for biasing said bar; and a tapered shank adapted to be received into a machine spindle, said tapered shank having an internally threaded bore at a widest end connected to said externally threaded end of said bar such that said tapered shank is connected to said bar and partially disposed within said cylindrically bored recess of said flange of said spindle extension element, there being axial clearance between said tapered shank and said recess such that said tapered shank moves axially in unison with said bar when said bar moves axially within said cylindrical portion, the connection between said tapered shank and said bar being adjustable to adjust the axial clearance between said shank and said recess, said shank moving toward said extension second axial end responsively to being contacted by a compressive force means within a machine.

23. A method of milling with a spindle extension comprising the steps of:

(A) testing the force from a host machine draw bar to thereby determine a relationship between the force from the machine draw bar and a distance the draw bar moves within the host machine;

(B) determining a desired length of a pull stud draw bar assembly within a spindle extension based on the tested force and relationship determined in step (A); and (C) adjusting the length of the pull stud draw bar assembly based on the desired length determined in step (B).

* * * * *

UNITED STATES PATENT AND TRADEMARK OFFICE
CERTIFICATE OF CORRECTION

PATENT NO. : 5,342,155
DATED : August 30, 1994
INVENTOR(S) : Harroun, Hugh

It is certified that error appears in the above-indentified patent and that said Letters Patent is hereby corrected as shown below:

In Claim 6, column 11, line 8, replace "claim 1", with --claim 5--.

In Claim 11, column 11, line 44, replace "with", with --will--.

In Claim 12, column 11, line 57, replace "bell", with --ball--.

In Claim 16, column 12, line 32, replace "contain", with --containing--.

In Claim 21, column 13, line 6, replace "and", with --end--.

Signed and Sealed this

Twenty-seventh Day of December, 1994

Attest:

BRUCE LEHMAN

*Attesting Officer*     *Commissioner of Patents and Trademarks*